Oct. 10, 1950 P. R. DAVIS 2,524,963
RANCH AND FARM SERVICE UNIT
Filed March 26, 1947
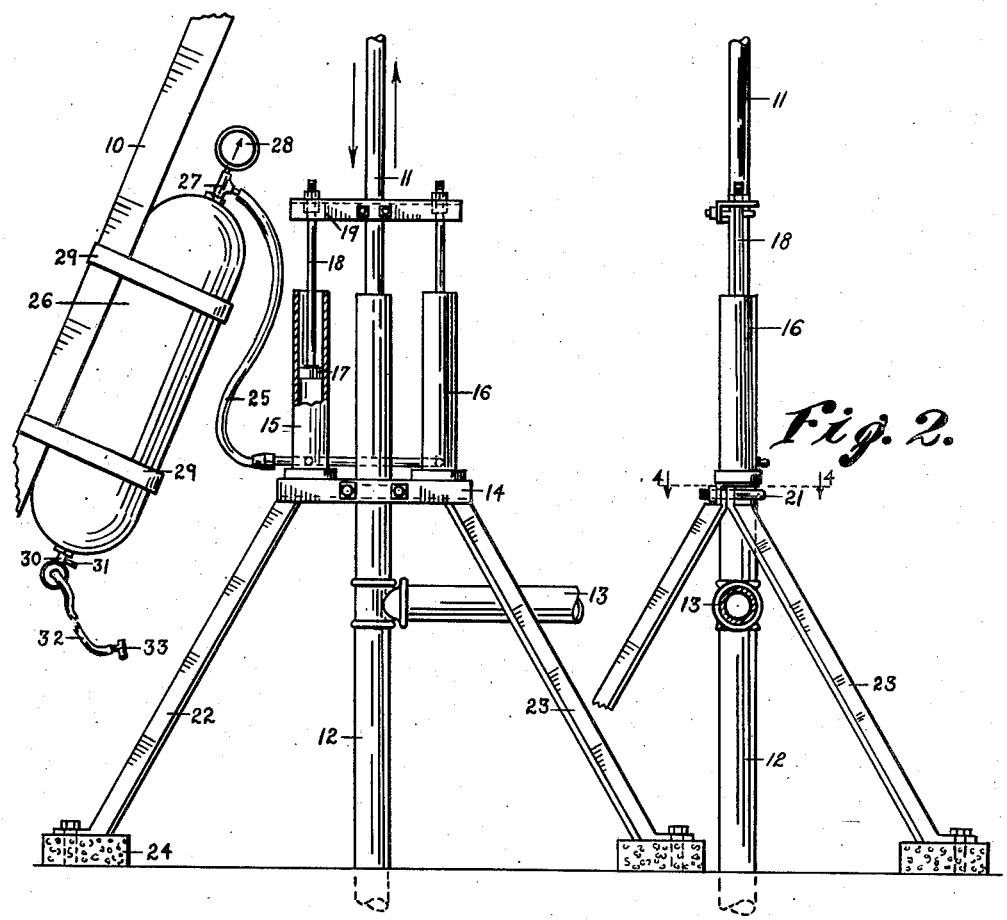
Fig. 1.
Fig. 2.
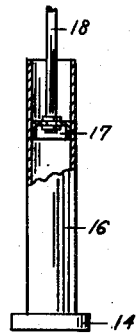
Fig. 3.
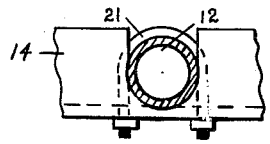
Fig. 4.
INVENTOR.
Pat R. Davis
BY Victor J. Evans & Co.
ATTORNEYS Patented Oct. 10, 1950

2,524,963

UNITED STATES PATENT OFFICE 2,524,963

RANCH AND FARM SERVICE UNIT

Pat R. Davis, Amarillo, Tex.

Application March 26, 1947, Serial No. 737,359

2 Claims. (Cl. 103—6)

This invention relates to a ranch and farm service unit adapted to be operated by a windmill on the ranch or farm which serves to pump the water.

It is an object of the present invention to provide a ranch and farm service unit wherein an air pump and compression tank can be connected to the sucker rod of the windmill which moves up and down to operate the water pump, so as to operate the air pump and deliver air under pressure to the pressure tank so as to have it on hand for numerous agencies such as devices for inflating tires, grease guns, painting, spraying cattle and so forth.

Other objects of the present invention are to provide a farm or ranch service unit which is of simple construction, easy to install, inexpensive to manufacture and efficient in operation.

For other objects and for a better understanding of the invention, reference may be had to the following detailed description taken in connection with the accompanying drawing, in which Fig. 1 is a fragmentary view of a windmill pump including a sucker rod and of the air pump which is adapted to be connected to ground supports so as to be operated by the same sucker rod that operates the water pump and which includes a pressure tank from which air under pressure can be obtained.

Fig. 2 is a side elevational view of the arrangement shown in Fig. 1.

Fig. 3 is a detail fragmentary view of one of the air cylinders.

Fig. 4 is a transverse cross-sectional view taken on line 4—4 of Fig. 2.

Referring now to the figures, 10 represents the frame of a windmill which has a depending sucker rod 11 adapted to move up and down as indicated by the arrows in Fig. 1. The sucker rod 11 is extended at its lower end to a water pump cylinder 12 extending into the ground and having a laterally extending outlet 13. About the cylinder 12 there is clamped an angle member 14 which supports a pair of air cylinders 15 and 16, one on each side of the sucker rod 11 and having a plunger 17 and a plunger rod 18 extending upwardly for connection with a cross arm 19 connected to the sucker rod. The support 14 is connected to the cylinder 12 by a U-shaped clamping member 21 and is supported further upon legs 22 and 23 which are fixed to concrete ground blocks 24.

When the sucker rod is moved up and down the plungers will be worked in the air cylinders 15 and 16 and air will be extended through a hose 25 under pressure to a pressure tank 26 fixed to a windmill support member 10. At the top of the pressure tank is a fitting 27 to which the hose 25 is extended and on the top of which is a pressure gauge 28. The tank 26 is fixed to the support 10 by straps 29. A cutoff valve 30 and a safety valve 31 is fixed to the lower end of the tank from which there is an air hose extension 32 with a fitting 33 thereon adapted to fit an air inlet of a tire, grease gun or the like.

While various changes shall be made in the detail construction, it shall be understood that such changes shall be within the spirit and scope of the present invention as defined by the appended claims.

I claim:

1. A ranch and farm service unit adapted for attachment to a windmill having a sucker rod, water pump casing and windmill support, which comprises air pump means including two air pump cylinders disposed respectively at opposite sides of the windmill water pump casing, a piston rod extending from each of the air pump cylinders, a transverse member for connecting the sucker rod with the piston rods whereby both piston rods will be worked together, and a support for the air pump cylinders connected to the windmill water pump casing and extending from the opposite sides thereof, and legs extending downwardly from the support for the air pump and adapted to be supported upon the ground.

2. A ranch and farm service unit as defined in claim 1 wherein a pressure tank is fixed to the windmill and a hose connection is provided between the air pump cylinders and the pressure tank, and a valve fitting is provided on the pressure tank from which a hose is extended.

PAT R. DAVIS.

REFERENCES CITED

The following references are of record in the file of this patent:

UNITED STATES PATENTS

| Number | Name | Date |
|---|---|---|
| 570,844 | Donato | Nov. 3, 1896 |
| 1,303,975 | Shorb | May 20, 1919 |
| 2,257,660 | Tilsy | Sept. 30, 1941 |

FOREIGN PATENTS

| Number | Country | Date |
|---|---|---|
| 601,536 | Germany | Oct. 1, 1934 |